United States Patent [19]

Edge et al.

[11] 3,973,940

[45] Aug. 10, 1976

[54] DELIVERY OF MOLTEN GLASS TO A GLASS FORMING PROCESS

[75] Inventors: Charles K. Edge, Sarver; Gerald E. Kunkle, New Kensington, both of Pa.

[73] Assignee: PPG Industries, Inc., Pittsburgh, Pa.

[22] Filed: Aug. 25, 1975

[21] Appl. No.: 607,857

Related U.S. Application Data

[63] Continuation of Ser. No. 474,848, May 30, 1974, abandoned.

[52] U.S. Cl. .............................. 65/65 A; 65/99 A; 65/182 R
[51] Int. Cl.² ........................................ C03B 18/02
[58] Field of Search ............... 65/65 A, 99 A, 182 R

[56] References Cited
UNITED STATES PATENTS 3,351,452  11/1967  Robinson ....................... 65/182 R
3,442,636  5/1969  Kita et al. ........................ 65/182 R FOREIGN PATENTS OR APPLICATIONS
803,685  7/1936  France Primary Examiner—Arthur D. Kellogg
Attorney, Agent, or Firm—E. Kears Pollock

[57] ABSTRACT

In the manufacture of flat glass, molten glass is delivered along a substantially horizontal delivery path onto a pool of molten metal. A stream of molten glass is deeper along its marginal portions than its central portion in order to provide for substantially uniform flow rates across the entire stream of molten glass. A continuous ribbon of flat glass of any thickness may be uniformly formed in a very short distance extending downstream from the delivery as a result of delivering the glass in this manner.

7 Claims, 2 Drawing Figures

DELIVERY OF MOLTEN GLASS TO A GLASS FORMING PROCESS

This is a continuation of application Ser. No. 474,848, filed May 30, 1974, now abandoned.

CROSS REFERENCE TO RELATED APPLICATIONS

The parent of this application is a continuation-in-part of application Ser. No. 338,497 filed by the present applicants on Mar. 6, 1973. Application Ser. No. 338,497 is now U.S. Pat. No. 3,843,346. That application discloses the making of flat glass by delivering molten glass directly in an undisturbed fashion onto a pool of molten metal and is incorporated by reference herein. As to all subject matter contained herein that is common to that earlier application, the priority of its filing data is asserted.

BACKGROUND OF THE INVENTION

1. Field of the Invention

This invention relates to the making of flat glass by a continuous process wherein glass is formed as a continuous sheet while being conveyed along the surface of a pool of molten metal. More particularly, this invention relates to an improved method for delivering molten glass from a glass melting and refining furnace to a glass forming chamber.

2. Description of the Prior Art

It has been known to form flat glass by delivering molten glass onto a pool of molten metal and cooling the glass to form a dimensionally stable, continuous sheet of glass while it is in contact with molten metal and then removing the continuous sheet of glass from the molten metal. U.S. Pat. No. 789,911 to Hitchcock shows horizontal delivery of molten glass onto a pool of molten metal in an enclosed chamber for forming a continuous sheet of flat glass. The art of manufacturing flat glass by floating glass on molten metal has developed since the time of Hitchcock in the manner disclosed by Pilkington in U.S. Pat. Nos. 3,083,551 and 3,220,816. In these processes, molten glass is poured downward onto a pool of molten metal and is allowed to spread in a laterally unhindered fashion outward from the location where it is poured onto the molten metal. It flows both laterally and rearwardly with respect to the general movement of glass along the surface of molten metal as it is drawn and cooled to form a dimensionally stable, continuous sheet of glass.

In the processes of glass forming involving the pouring of molten glass downward onto a pool of molten metal, there have been various developments and improvements in the delivery of molten glass onto the pool of molten metal. In particular, it has been proposed that the stream of glass flowing over a lip and downward onto a pool of molten metal be a stream that is deeper in its central portion than in its edge portions in order to provide an adequate flow of molten glass in the central region of the stream to satisfy both the rearward flow of glass on the molten tin and the forward central flow of molten glass on the molten tin. This is shown in U.S. Pat. No. 3,351,452 to Robinson. A further improvement of the method and apparatus of Robinson is shown in U.S. Pat. No. 3,576,612 to Prislan wherein a concave-shaped tweel is provided with means for differentially heating it across its transverse width.

When molten glass is directly delivered horizontally onto a pool of molten metal, it has been found that if the glass is relatively rapidly cooled and attenuated in a short distance extending down the stream from the point of delivery onto the molten metal, the continuous sheet that is formed may have a non-uniform transverse thickness. This may be avoided by carrying out the process in the manner described in the parent of this application wherein differential transverse heating of the body of glass downstream of its point of delivery onto a pool of molten tin is accomplished in order to provide for a substantially flat velocity profile in the stream of glass. The present invention contemplates an improved structure for delivering molten glass along a horizontal path onto molten metal for forming and an improved method for carrying out such delivery of molten glass onto molten metal so that a dimensionally stable ribbon of glass may be established within a short distance downstream from the point of delivery with the continuous sheet of glass so formed having a uniform transverse thickness.

SUMMARY OF THE INVENTION

Molten glass is delivered from a glass melting and refining furnace along a substantially horizontal path onto a pool of molten metal within an enclosed forming chamber. The stream of molten glass is much greater in width that in depth and its marginal portions are deeper than its central portion as it is delivered onto the pool of the molten metal. The molten glass that has been delivered onto the pool of molten metal is conveyed along the surface of molten metal and is cooled to form a dimensionally stable, continuous sheet of flat glass. This continuous sheet of flat glass is then removed from the pool of molten metal and from the enclosed forming chamber. It is then further processed to provide useful flat glass articles.

In the practice of this invention, molten glass residing within a pool of molten glass contained in a glassmaking furnace is caused to flow through an opening in a wall of the furnace and onto a pool of molten metal contained within an enclosed forming chamber. The opening through which the molten glass is delivered from the glassmaking furnace to the enclosed forming chamber is defined by a bottom or threshold member which separates the pool of molten glass from the pool of molten metal onto which the glass is to be delivered, by side members or jambs extending upwardly from the threshold member and by a metering member or tweel engaging the side members and extending downwardly toward the threshold member. The tweel has a bottom surface for engaging the molten glass and for controllig the size of the opening through which molten glass may flow. The opening has much greater width than depth during glassmaking operations. The ratio of width to depth is typically on the order of 30 to 1 or greater and preferably is on the order of from about 50 to 1 to about 150 to 1. The overall structure is substantially that described in application Ser. No. 338,497, which is the parent of this application and which is incorporated by reference herein.

The threshold is preferably in a horizontal position with its upper surface being flat and horizontal along its transverse length which extends across the direction for glass flow across it. The preferred threshold has an upwardly-facing convex upper surface when viewed longitudinally (that is, a section taken along the direction of intended glass flow over the threshold has a convex upper surface). The side members defining the edges or sides of the opeing through which molten glass may flow extend upwardly from the threshold in the vicinity of each end of the block forming the threshold. The side members or jambs are preferably concave along their surfaces which face each other in order to receive and hold a metering member or tweel.

The metering member or tweel employed in the present invention is a slab-like structure having a bottom surface that is convex in its transverse dimension extending across the direction of intended glass flow. It preferably has a convex shape when viewed longitudinally as well. The sides or ends of the tweel are preferably chamfered for engaging the side members. This engagement prevents the tweel from moving downstream due to the hydrostatic and flow pressures against the upstream face of the tweel. The tweel is provided with means for supporting it and means for moving it upwardly and downwardly to vary the space between the tweel and the threshold, thus varying the size of the opening through which molten glass may flow.

All of the elements comprising the delivery means through which molten glass flows are made of materials which will withstand the erosive and corrosive actions of molten glass. Preferably, the threshold, the side members and the tweel are of fine grained, fused cast silica.

The bottom of the metering member or tweel has a contoured shape so that it presents a downwardly-facing convex surface to engage the molten glass and to provide a greater depth for glass flow near the side members than in the central portion of the opening defined by the side members, the threshold and the tweel. The bottom surface of the tweel may be defined as a continuous arcuate curve or may comprise a series of relatively straight sections joined together in rounded regions of intersection. For example, a particularly useful tweel has a bottom surface having a central section that is flat for being positioned horizontal and parallel to the top of the threshold and two marginal sections that extend angularly upward from the flat central section. The regions between the sections are rounded to blend the substantially flat surfaces together into a continuous, smooth, downwardly-facing convex surface. In a particularly preferred embodiment, the central section constitutes about one-half of the total width of the tweel with the two side sections each constituting about one-quarter of the width of the tweel.

Whether the bottom surface of the tweel is shaped from three substantially straight sections or otherwise, it is convenient to define the shape of the tweel in terms of a middle, half-width section and two marginal quarter-width sections. This is so even if the tweel has a bottom that is an arcuate shape or one that is comprised of a plurality relatively straight sections. With the tweel placed in the space between the side members and above the threshold, the combination defines an opening through which molten glass may flow. The central half-width portion of this opening will have some average height and a width that is half the width of the entire opening. Each of the marginal quarter-width portions of the opening will have an average height and a width that is a quarter of the width of the entire opening. Thus, molten glass flowing through the opening may be considered as three adjacent streams of molten glass flow for purposes of understanding the particular size relationship of portions of the total opening which are maintained in the practice of this invention.

In a preferred embodiment of this invention, the combined throughput, that is, the volumetric flow of molten glass through both marginal quarter-width portions of the opening is maintained at least about 90 percent of the throughput of the central half-width portion of the opening even when the average temperature of the marginal quarter-width portions is about 30°F. (17°C.) lower than average temperature half-width portion. Because of heat loss through the front wall of a glassmaking furnace to which the present delivery means is attached and through the side members of the delivery means, it is usual in the absence of any provision for adding heat to the glass that the marginal glass becomes colder than the central flowing glass as it is caused to flow across the threshold. Because of this and because of the inherent viscous drag exerted by the flowing molten glass on the side members, the flow rate of molten glass would, in the absence of practicing this invention, be less in the marginal portions of the stream than in the central portion of the stream in addition to being colder than in the central portion of the stream. Consequently, if the glass is cooled sufficiently to form a dimensionally stable, continuous sheet of glass in a space extending about 10 feet (3 meters) downstream of the threshold, the sheet of glass is characterized by a slightly non-uniform thickness across its width and by some observable optical distortion in its marginal portions. By employing a tweel having a bottom surface that is contoured in the manner already described, it is possible to form a dimensionally stable, virtually distortion free, continuous sheet of glass within about 10 feet (3 meters) from point of delivery of molten glass onto molten metal. This may be done without having to resort to supplemental temperature control of the marginal portions of glass either upstream of the tweel or downstream of the tweel.

In a more specific, related embodiment of this invention, the tweel is shaped and adjusted so that molten glass delivered between the tweel and the threshold onto molten metal is sufficiently greater in depth in its marginal portions than its central portion to cause the surface velocity of the flowing stream of glass on the molten tin at a distance about equal to the width of the stream downstream from the location where the molten glass is delivered onto the molten metal is substantially constant within the central 90 percent of its width. The surface velocity of the flowing stream of glass on the molten metal may be determined by inserting a straight section of angle iron across the stream of glass in the enclosed chamber with the angle iron being partially filled with sand, then rotating the angle iron to dump all of the sand onto the ribbon of glass across its width, forming a straight line of sand on the glass. If the glass at different locations along the surface across the width of the stream of glass is flowing at different velocities, it will cause the straight line of deposited sand to become distorted in direct relationship to the different velocities. In this preferred embodiment of the invention, the velocities are sufficiently constant across the width of the stream of glass so that when the glass upon which it is deposited is fully cooled and formed, the line defined by the sand is either straight or only slightly arcuate with the sagitta of an arc formed from the sand being less than about one percent of the speed of the ribbon of continuous sheet of glass expressed in distance per minute. For example, if the linear speed of the continuous sheet of glass at the lehr downstream of the forming chamber is 200 inches per minute (5 meters per minute) the sagitta of the velocity profile would be two inches (5 centimeters) or less at a location 10 feet (3 meters) downstream of the threshold when the width of the stream and the continuous sheet of glass is 10 feet (3 meters).

The apparatus of this invention and particular embodiments of the method of this invention may be described in terms of relative molten glass depth within the stream of molten glass passing through the marginal quarter-width portions of the opening through which glass flows and the central half-width portion of the opening. In the preferred embodiments of this invention the marginal quarter-width portions of the molten glass stream are from 1.05 to 1.5 times the depth of the central half-width portion of the molten glass stream.

Inasmuch as one function of the tweel is to vary the overall size of the opening through which molten glass may flow in order to control the rate at which a continuous sheet of flat glass is produced, it is a part of this invention to provide a method whereby the relative marginal and central flow rates may be maintained over a substantial range of total glass flow rates. Although it is possible to operate with a plurality of tweel sections that may be raised and lowered independently one from the other, it is preferred to employ a tweel of fixed dimensions over the entire width of the delivery channel. For example, a tweel may be shaped to provide a 1 inch (2.5 centimeters), threshold-to-tweel spacing over the center section of the tweel and an inch-and-a-half (3.75 centimeters) threshold-to-tweel spacing over the marginal sections of the tweel. This provides a molten glass flow opening having marginal portions that have depths that are 1.5 times the central portion depth. However, if such a tweel is lowered to provide a central tweel-to-threshold depth of one-half inch (1.25 centimeters), the marginal portions inherently have depths of one inch (2.5 centimeters) so that the ratio of marginal depth to central depth becomes 2 to 1.

In the absence of some technique for compensating for this variation, the desired relative marginal and central flows could not be maintained. However, in the practice of this invention, it has been found that the temperature of the molten glass upstream of the threshold and tweel may be controlled responsive to the tweel position in order to control the relative marginal and central molten glass flow rates within the range that has been found desirable from the standpoint of producing the range that has been found desirable from the standpoint of producing glass of uniform thickness and high optical quality. As a contoured tweel is lowered, sufficient heat is applied to the glass upstream of the tweel (or in the alternative cooling of molten glass upstream of the tweel is sufficiently diminished) so that the flow of glass through the marginal portions of the opening is maintained relative to the flow of molten glass through the central portion of the opening. These relative flows are maintained as the total flow through the entire opening is diminished. As the tweel is raised, the converse of this procedure is followed.

This invention will be further understood with reference to the drawings accompanying this application.

DESCRIPTION OF THE PREFERRED EMBODIMENTS

Figure 1:
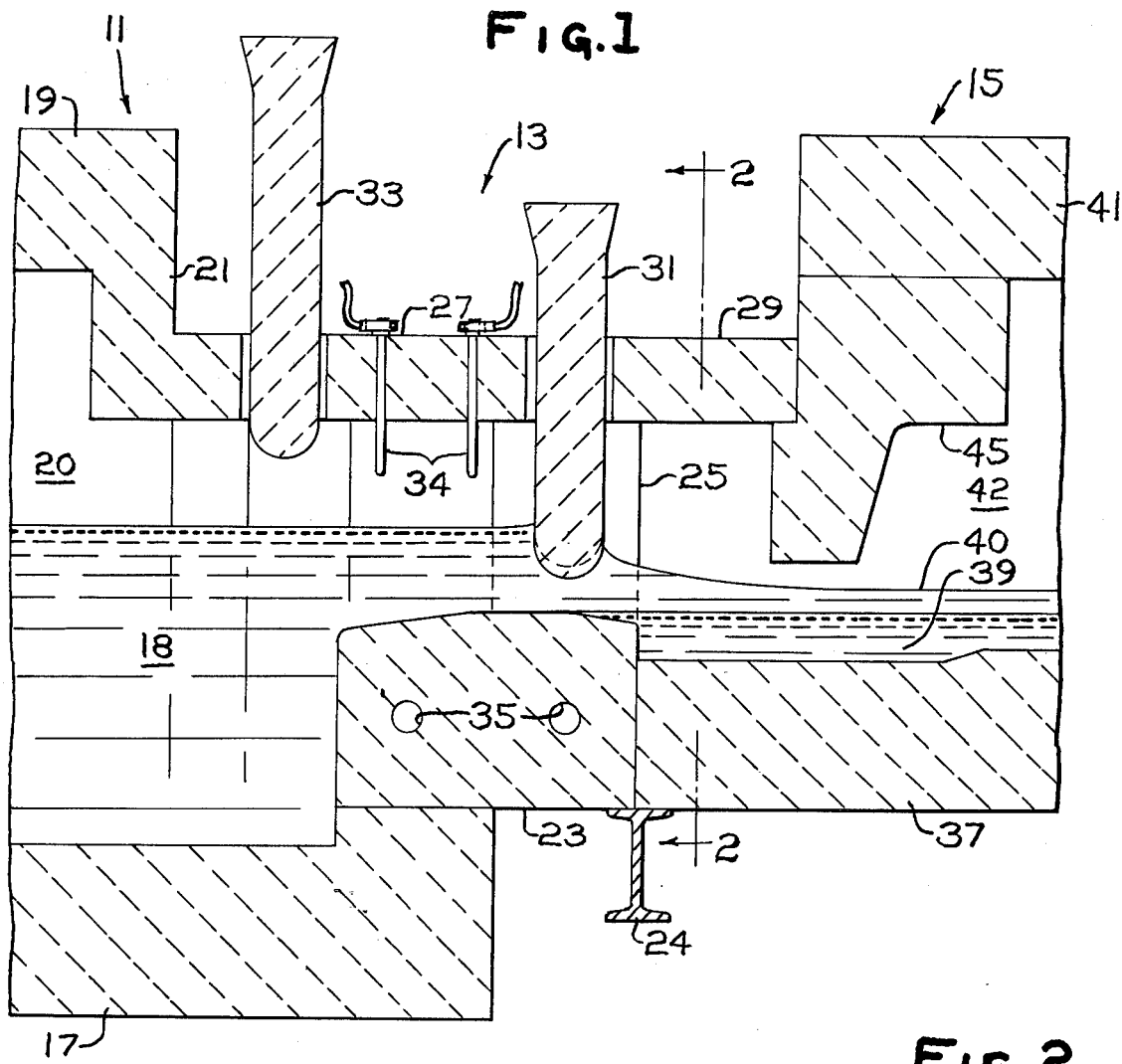
FIG. 1 is a longitudinal sectional elevation of a delivery section connecting a refiner or conditioner of a glassmaking furnace to an enclosed glass forming chamber showing a contoured metering member in combination with side members and a threshold according to the applicants' invention.
Figure 2:
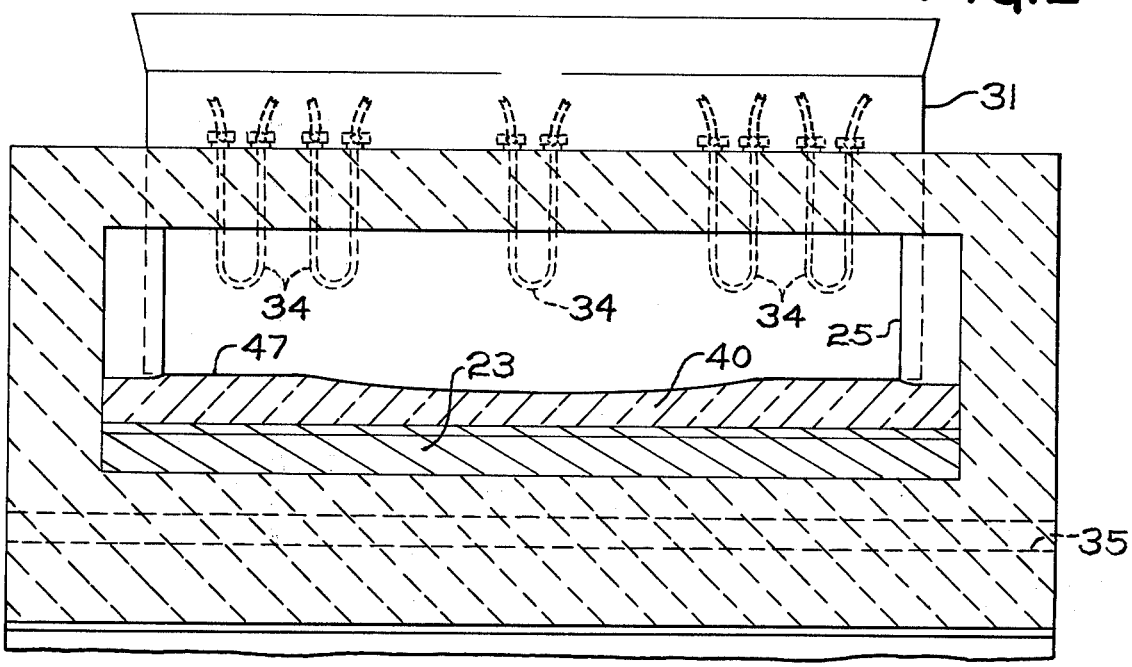
FIG. 2 is a transverse or lateral sectional elevation of the apparatus of FIG. 1 taken along line 2—2 of FIG. 1.

Referring now to FIGS. 1 and 2, there is shown a glassmaking facility including a glassmaking furnace and a glass forming chamber. The downstream end of a refiner or conditioning section of a glassmaking furnace 11 is connected by a delivery means 13 to the upstream or inlet end of an enclosed glass forming chamber 15. The refiner of the glassmaking furnace comprises a bottom portion 17 containing a pool of molten glass 18 as well as a roof 19 and side walls 20. The glassmaking furnace includes a front wall 21 to which there is connected the delivery means 13.

The delivery means 13 comprises a threshold 23 resting on a support structure 24. Extending upwardly adjacent the end of the threshold 23 are side members 25, also referred to as jambs. Extending over the delivery means are roof portions 27 and 29 characterized as flat arches. A metering member or control tweel 31 extends downwardly through the roof portion of the delivery means toward the threshold 23 so that it can contact and engage a stream of molten glass flowing from the pool of molten glass 18 within furnace 11. Located upstream of the control tweel 31 is a back-up tweel 33, preferably just upstream of the threshold 23.

Preferably, means are provided for controlling the temperature of the delivery means 13 and for controlling the temperature of molten glass flowing through the delivery means. Optional heating elements 34 extend into a space extending above the intended level for molten glass in the delivery means. These are conveniently placed in the space between the control tweel 31 and the back-up tweel 33. Also, in the threshold 23 access openings 35 are provided for receiving means for heating or cooling at the threshold 23. Preferably, coolers are disposed in these holes. For example, water-cooled pipes are conveniently inserted through such holes to not only control the temperature of the threshold 23 but also to impart structural stability to the threshold as well.

The glass forming chamber 15 is connected to the delivery means 13. It includes a bottom portion 37, and the bottom portion 37 contains a pool of molten metal 39, preferably molten tin, which is sufficiently deep to at least partially submerge a downstream portion of a preferred convex threshold 23. As a stream of molten glass is delivered onto this pool of molten metal, a continuous sheet of glass 40 is formed therefrom and cooled and conveyed along the surface of the molten metal 39. The glass forming chamber 15 further comprises a roof 41 extending above the bottom portion of the forming chamber 37 and defining a headspace 42 above the molten metal 39 and the glass 40. This headspace 42 may be filled with protective gases such as inert gases or gases which will react with and scavenge any entering oxygen. For example, an atmosphere comprising nitrogen and hydrogen is useful to prevent oxidation of the molten metal within the chamber. The forming chamber 15 further comprises at its inlet end a lintel 45 extending across the width of the chamber providing a connection between the delivery means 13 and the forming chamber 15 and supporting the flat arch 29.

Referring now particularly to FIG. 2, it is apparent that the metering member or tweel 31 is provided with a contoured bottom surface 47 which extends transversely across the direction of intended molten glass flow through the apparatus. The tweel 31 with its downwardly-facing convex bottom surface 41 in combination with the side members 25 and the threshold 23 defines an opening through which molten glass may flow. The stream of molten glass flowing through the opening will be deeper in its marginal portions than in its central portion. As seen in FIG. 2, the central section of a preferred tweel is substantially arcuate along its bottom surface and the marginal sections of the tweel have bottom surfaces that are substantially flat. The bottom surfaces of the tweel sections are smoothly merged together in rounded regions of intersection. Alternatively, the entire bottom surface of tweel 31 may be arcuate in shape or may comprise a plurality of substantially flat or straight bottom surfaces merged together in regions of rounded intersection. Also, three or more separate tweel sections, each independently adjustable upwardly and downwardly, may be employed. However, a single member tweel is preferred to avoid devitrification of glass in the interstices between separate tweel sections.

The transverse shape of the bottom surface 47 of the tweel 31 may be conveniently considered as comprising three sections for purposes of analyzing the flow of molten glass beneath it. This is so whether the bottom surface is physically or mechanically defined in three sections or otherwise. For purposes of defining the flow beneath the tweel 31, the opening through which molten glass may flow is divided into three portions: a central half-width portion and two marginal quater-width portions. According to conventional principles of hydraulics, the volumetric and mass flow along a horizontal path through an opening in the wall of a container may be defined in terms of the hydrostatic head driving the flow, the opening size in terms of cross sectional dimension, the length of the flow path and the viscosity of the fluid flowing through the opening. The following relationship is used to describe the overall flow:

$$Q = \frac{\Delta P\, B^3 w}{12 \mu L}$$

wherein the terms in the relationship are defined as follows:

Q is the volumetric flow expressed in length units to the third power per unit time (e.g. cubic inches/minute);

P is the hydrostatic head or pressure driving force causing flow expressed in units of mass divided by length or height times time squared (e.g. pounds per inch minute$^2$) and is equal to the depth of the molten glass upstream of the opening less the height of the opening multiplied by the density of the molten glass and times the gravitational constant;

B is the height of the opening expressed in units of length (e.g. inches);

w is the width of the opening expressed in units of length (e.g. inches);

$\mu$ is the viscosity of the molten glass expressed in units of mass divided by length times time (e.g. pounds per inch/minute); and L is the length of the opening across the threshold beneath the tweel expressed in units of length (e.g. inches).

The viscosity of glass is related to temperature according to Fulcher's equation which is $$\log_{10}\mu = A + \frac{B}{T - T_o}$$

in which the terms of the equation are defined as follows:

A, B, $T_o$ are experimental constants (typical values of $\approx -1.6$, 7500, and 500 respectively) for soda-lime-silica glass T is the temperature (°F.)

According to these relationships, the overall flow of molten glass through an opening of a delivery means may be conveniently established. It is necessary, however, to determine the flow of molten glass through separate portions of the opening in order to design and operate a molten glass delivery apparatus according to this invention. This is accomplished by integrating the well-known differential flow relationship of Navier-Stokes to define molten glass flow through the opening from the center line of the opening outward to a boundary between the central portion of the opening and an outer quarter-width portion of the opening and also from that point on to the edge of the opening. According to this integration and substitution of boundary limits, the central portion flow is represented by $$Q\text{ central} = \frac{11 \Delta P\, B^3 w}{192 \mu L}$$

and the sum of the two marginal portion flows is represented by $$Q\text{ marginal} = \frac{5 \Delta P\, B^3 w}{192 \mu L}$$

with the individual terms being identical to those defined above and having the values incidental to the particular portion of the opening described rather than the average values for the opening as a whole.

Based upon these relationships the applicants have established that for the delivery of molten glass along a horizontal path onto molten metal for forming the delivery opening should have an average marginal depth that is from 1.05 to 1.5 times its central depth. This is for the delivery of a wide, shallow stream of molten glass to be formed into a continuous sheet or ribbon of glass having about the same width as the delivered stream of molten glass.

This invention may be further appreciated from the following examples:

EXAMPLE I

A soda-lime-silica glass is melted and refined or conditioned for delivery onto molten metal and forming thereon. The molten glass is contained as a pool in a conditioner like that shown in FIG. 1. The temperature of the molten glass just upstream of the control tweel in the delivery apparatus connecting the conditioner to the forming chamber is about 1995°F. (1090°C.) near the center of the delivery opening and about 2035°F. (1110°C.) near the sides of the delivery opening. The height of the opening (depth of the stream) is about 1.86 inches (4.72 centimeters) at the edges sloping down to about 1.49 inches (3.78 centimeters) at locations inward from the edges about one quarter (30 inches or 76.2 centimeters) of the opening width (10 feet or 3 meters). The central section of the tweel has a flat bottom surface so that the height of the central portion of the opening is 1.49 inches (3.78 centimeters) throughout. The marginal sections of the tweel have sloped, flat bottom surfaces so the average height of each marginal portion of the opening is 1.67 inches (4.25 centimeters).

The molten glass is delivered through the opening at a rate of 600 tons per day. The flow through the marginal portions of the opening is slightly less than 300 tons per day and through the central portion of the opening slightly greater than 300 tons per day.

A sand trace is made at a location about 10 feet (3 meters) downstream from the tweel and threshold. The temperature of the glass (central portion) at that location is about 1600°F. (870°C.). The sand trace appears in the 10 foot (3 meters) wide finished sheet of glass as a slight parabola. A straight line is marked across the sheet of glass to intersect the sand trace at locations in from each edge of the sheet about 6 inches (15.2 centimeters). The distance between the sand trace and the line at the center of the sheet of glass is less than 2 inches (5 centimeters). The thickness of the glass sheet is 0.25 inch (6.2 millimeters), and the speed of the sheet during its removal from the forming chamber and travel through a subsequent annealing lehr is about 200 inches per minute (5.08 meters per minute).

The glass produced has excellent optical quality and is free of objectionable distortion.

EXAMPLE II

The procedure of Example I is repeated except the height of the tweel is varied from time to time. As the tweel is lowered, more power is applied to the heaters upstream of the tweel over the central portion of the stream relative to those over the marginal portions of the stream. As the tweel is raised, the relative power application is reversed. The amount of power applied to each heater is monitored and a series of sand traces are made at each tweel setting for the power setting tested. A power setting is established for each tweel setting over a range of tweel settings such that the flat velocity profile achieved in Example I may be maintained as the height of the tweel is varied.

When glass is produced at higher or lower throughput than Example I, the quality is found to be best when the glass temperatures are adjusted along with the tweel height to equalize the volumetric flow acrosss the width of the tweel-to-threshold opening.

Although this invention has been described with particular reference to certain preferred embodiments of it, variations may be made without departing from the spirit or scope of this invention. For example, the stream or layer of molten glass that is delivered to the forming chamber may be delivered along a perfectly horizontal path or may be delivered along a sloping path (so long as it remains supported and does not fall freely or turn sharply — more than about 45°) and yet achieve the advantages of this invention.

We claim:
1. In a method of making flat glass wherein a stream of molten glass is delivered along a substantially horizontal delivery path from a pool of molten glass onto a pool of molten metal, the stream having marginal quarter width portions of greater depth than its central half width portion; wherein the delivered glass is advanced as a layer along the surface of the pool of molten metal while being cooled sufficiently to form a dimensionally stable continuous sheet of glass; wherein the continuous sheet of glass is removed from the pool of molten metal; and wherein the rate of molten glass delivery is varied from time to time such that higher and lower throughputs of molten glass are delivered at different times; the improvement which comprises adjusting and maintaining the temperature of the molten glass prior to delivery across the width of the stream by maintaining the molten glass of the central half width portion sufficiently hotter when at a lower throughput than when at a higher throughput and maintaining the molten glass of the marginal quarter width portions sufficiently colder when at a lower throughput than when at a higher throughput to maintain molten glass throughput in the combined marginal quarter width portions to be at least 90 percent of molten glass throughput in the central half width portion; and adjusting and maintaining the temperature of the delivered glass across its width at a temperature sufficient to provide the advancing glass with surface velocities in its marginal quarter width portions that are at least 90 percent of its surface velocity in its central half width portion at a location spaced the width of the delivered glass from the location at which the glass is delivered onto the molten metal; whereby the continuous sheet of glass has substantially uniform thickness across its width.

2. The method according to claim 1 wherein the depth of the molten glass stream in its marginal quater-width portions is maintained from about 1.05 to about 1.5 times the depth of the molten glass stream in its central half-width portion.

3. In an apparatus connecting a glass making furnace to a glass forming chamber for delivering molten glass from a pool of molten glass in the furnace onto a pool of molten metal in the chamber for forming flat glass including a threshold member, side members, a roof and a metering member wherein the combination provides a substantially horizontal path for delivering molten glass, the improvement comprising:

a single metering member having a smoothly contoured bottom surface, which in combination with the threshold member provides a channel through which molten glass may flow, the channel being composed of marginal edge portions and a center portion and being larger near said side members than near said center portion, and means for adjusting and maintaining the temperature of molten glass flowing between the threshold and the metering member comprising a plurality of discrete heaters mounted transversely within the delivery apparatus adjacent the furnace and spaced from the threshold, at least one of each of said heaters being positioned in a location above each marginal portion and said center portion of said channel, means for individually powering each of said heaters and means for individually controlling the power input to each said heater for varying the heat applied by said heaters to molten glass across the width of the channel.

4. The apparatus according to claim 3 wherein said metering member has a contoured bottom surface having a central half section with an average length sufficiently greater than the average length of each of two marginal quater-width portions such that when positioned in operative relationship with said threshold member and side members it defines a channel through which molten glass may flow that has marginal portions that are from about 1.05 to about 1.5 times greater in average metering member-to-threshold spacing than the average metering member-to-threshold spacing in the central half-width portion of the channel.

5. The apparatus according to claim 3 wherein said metering member has a transversely contoured bottom surface that is defined by a continuous convex curve.

6. The apparatus according to claim 3 wherein said metering member has a transversely contoured bottom surface defined by at least three substantially flat surfaces having rounded regions of intersection.

7. The apparatus according to claim 6 wherein said metering member has a longitudinally contoured bottom surface that is substantially rounded and a transversely contoured bottom surface defined by a substantially horizontal central section and two substantially flat marginal sections angled upwardly from the central section with the regions of intersection between adjacent sections being rounded.

* * * * *